United States Patent
Takeshima et al.

(10) Patent No.: US 8,098,963 B2
(45) Date of Patent: Jan. 17, 2012

(54) RESOLUTION CONVERSION APPARATUS, METHOD AND PROGRAM

(75) Inventors: Hidenori Takeshima, Ebina (JP); Toshimitsu Kaneko, Kawasaki (JP); Takashi Ida, Kawasaki (JP); Nobuyuki Matsumoto, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 756 days.

(21) Appl. No.: 12/234,164

(22) Filed: Sep. 19, 2008

(65) Prior Publication Data

US 2009/0110331 A1    Apr. 30, 2009

(30) Foreign Application Priority Data

Oct. 29, 2007 (JP) .................. 2007-280761

(51) Int. Cl.
*G06K 9/32* (2006.01)
(52) U.S. Cl. ......... 382/299; 382/260; 382/274; 382/275
(58) Field of Classification Search .............. 382/260, 382/274, 275, 278, 299
See application file for complete search history.

(56) References Cited

U.S. PATENT DOCUMENTS

| | | | |
|---|---|---|---|
| 7,124,041 B1 * | 10/2006 | Johnson et al. | 702/58 |
| 7,174,092 B2 * | 2/2007 | Nagai et al. | 386/241 |
| 7,358,502 B1 * | 4/2008 | Appleby et al. | 250/370.14 |
| 7,666,004 B2 * | 2/2010 | Johnson et al. | 439/76.1 |
| 7,783,096 B2 * | 8/2010 | Chen et al. | 382/128 |
| 2007/0237416 A1 | 10/2007 | Taguchi et al. | |
| 2007/0237425 A1 | 10/2007 | Taguchi et al. | |
| 2007/0269137 A1 | 11/2007 | Ida et al. | |
| 2008/0107356 A1 | 5/2008 | Matsumoto et al. | |

OTHER PUBLICATIONS

U.S. Appl. No. 12/397,747, filing date Mar. 4, 2009, Matsumoto, et al.
U.S. Appl. No. 12/408,918, filing date Mar. 23, 2009, Takeshima, et al.
Sung Cheol Park, et al., "Super-Resolution Image Construction: A Technical Overview", IEEE Signal Processing Magazine, May 2003, pp. 21-36.
Masao Shimizu, et al., "Precise Sub-Pixel Estimation on Area-Based Matching", Pro. IEEE International Conference on Computer Vision, 2001, pp. 90-97.
Jiangjian Xiao, et al., "Motion Layer Extraction in the Presence of Occlusion Using Graph Cuts", IEEE Transactions on Pattern Analysis and Machine Intelligence, vol. 27, No. 10, Oct. 2005, pp. 1644-1659.

(Continued)

*Primary Examiner* — Yosef Kassa
(74) *Attorney, Agent, or Firm* — Oblon, Spivak, McClelland, Maier & Neustadt, L.L.P.

(57) ABSTRACT

An apparatus includes unit acquiring a target image as a target of resolution conversion, unit acquiring an additional image from the image source, unit estimating a corresponding point in the target image using corresponding point estimation methods, the corresponding point being associated with at least one pixel in the additional image to obtain corresponding points in the target image, unit setting a pixel value of each pixel included in the additional image as a sampling value for the corresponding point when each pixel is set as a target pixel, to obtain sampling values for pixels included in the additional image, and unit generating an image of a first resolution into which a second resolution of the target image is converted, using pixel values and positions of pixels included in the target image, and the sampling values and positions of the corresponding points.

12 Claims, 8 Drawing Sheets

OTHER PUBLICATIONS

Robert G. Keys, "Cubic Convolution Interpolation for Digital Image Processing", IEEE Transactions on Acoustics, Speech, and Signal Processing, vol. ASSP-29, No. 6, Dec. 1981, pp. 1153-1160.

Masao Shimizu, et al., "Two-Dimensional Simultaneous Sub-Pixel Estimation for Area-Based Matching", The Institute of Electronics, Information and Communication Engineers, D-II, vol. J87-D-II, No. 2, Feb. 2004, pp. 554-564.

* cited by examiner

101 Target image pixel

1501 Detected corresponding point

FIG. 15

101 Target image pixel

1601 Detected corresponding point

RESOLUTION CONVERSION APPARATUS, METHOD AND PROGRAM

CROSS-REFERENCE TO RELATED APPLICATIONS

This application is based upon and claims the benefit of priority from prior Japanese Patent Application No. 2007-280761, filed Oct. 29, 2007, the entire contents of which are incorporated herein by reference.

BACKGROUND OF THE INVENTION

1. Field of the Invention

The present invention relates to a resolution conversion apparatus, method and program for computing, for example, a higher resolution image from input images.

2. Description of the Related Art

High resolution TV sets and displays have come to be available. When an image is displayed on a TV set panel or display panel, the number of pixels included in image data is converted into that of pixels included in the panel. In particular, when performing conversion for enhancing the resolution, i.e., increasing the number of pixels, there is a known method for providing sharper images than linear interpolation. In this method (hereinafter referred to as the "reconstruction-based super resolution"), information concerning a plurality of frames is used to restore a high resolution image, considering inverse conversion of the image pickup process (degradation process) of the image.

In the reconstruction-based super resolution, attention is paid to the fact that both a reference frame and another frame contain images of the same subject. In consideration of this fact, motion of the subject is detected with a higher accuracy (subpixel-order accuracy) than the size of pixels, and a plurality of sampling values associated with the positions of the subject slightly displaced from the positions associated with pixel values are obtained, thereby combining the position information to realize a high resolution image. Assume here that the term "pixel value" indicates the level of an intensity signal output from each pixel of the image, and that the term "sampling value" indicates an intensity signal level corresponding to each subpixel position on an image of the subject. Namely, the term "pixel value" is associated with each integer pixel position, while the term "sampling value" is associated with an arbitrary subpixel position including the integer pixel position.

The reconstruction-based super resolution will be described in more detail. In this method, when low-resolution frames are temporally sequentially supplied, they are sequentially converted into high-resolution ones. For instance, consider the case that subsequent three frames of a moving picture obtained by photographing a moving vehicle are supplied as low-resolution frames. One of the three frames is used as a reference frame and subjected to a magnification process, where, for example, the resolution of the one frame is doubled on both horizontal and vertical directions (i.e., magnification factor is 2×2). When only one frame is used, the number of the pixels included in a low-resolution image (i.e., the number of known sampling values) is lower than that of the pixels included in an unknown high-resolution image. Even from this state, the pixel values of the unknown high-resolution image can be estimated. However, if the number of known sampling values can be increased, the unknown high-resolution image can be estimated more accurately. To this end, in the reconstruction-based super resolution, it is detected which pixel position on the reference frame of a low-resolution image corresponds to a certain pixel of another low-resolution frame at which a subject is picked up, and the pixel value of the detected pixel position on the reference frame is used as a sampling value associated with the certain pixel of the other frame.

Specifically, for example, a square block of several pixels around and including a target pixel is extracted from a certain frame of a low-resolution image, and a block, which has the same size as the block and includes pixel values close to those of the first-mentioned block, is searched for in the reference frame of the low-resolution image. A search is performed with subpixel estimation (see, for example, M. Shimizu et al., "Precise Subpixel Estimation on Area-based Matching," in Proc. IEEE International Conference on Computer Vision, pp. 90-97, 2001). The center of the detected block is set as a point associated with the extracted block of the certain frame. Thus, point A in the certain frame is associated with point B in the reference frame, namely, these points are regarded as the same point on a subject. Such an associating algorithm as this will hereinafter be referred to as "block matching." The above association is expressed by a motion vector that uses the point A as an initial point and the point B as an end point. Since searches are performed with subpixel estimation, the initial point of each motion vector indicates the position of a pixel, and the end point generally indicates a position at which no pixel exists. Motion vectors associated with all pixels of a low-resolution frame are acquired. Also concerning another low-resolution frame, motion vectors, which use their pixels as initial points and the associated pixels of the reference frame as end points, are detected. After acquiring motion vectors, the pixel value of the initial point of each motion vector is provided as a sampling value for the end point. From the sampling values arranged in a non-uniform grid, the values of the pixels of a high-resolution image uniformly arranged in a uniform grid are acquired. As such a conversion (degradation inverse conversion) method, non-uniform interpolation, POCS, ML or MAP estimator is known (see, for example, S. C. Park et al., "Super-Resolution Image Reconstruction: A Technical Overview," IEEE Signal Processing Magazine, pp. 21-36, May 2003).

As well as the above-mentioned local block matching, global motion estimation, layer motion estimation, and the like are regarded as association methods (see, for example, J. Xiao et al., "Motion layer extraction in the presence of occlusion using graph cuts," IEEE Transaction on Pattern Analysis and Machine Intelligence, vol. 27, no. 10, pp. 1644-1659, October 2005). In global motion estimation, motion of an image is assumed, for example, to be uniform over the entire screen as a panning by a camera, and a single block similar to the above-mentioned one is set over the entire screen to detect a single motion vector. Further, in layer motion estimation, motion of each object on a screen is estimated.

As described above, there are many motion estimation methods. Which method is suitable differs between images. When the motion estimation method employed is suitable, a more accurate high-resolution image can be obtained, whereas when it is not suitable, the quality of the reconstructed high-resolution image will be insufficient.

BRIEF SUMMARY OF THE INVENTION

In accordance with an aspect of the invention, there is provided a resolution conversion apparatus comprising: a first acquisition unit configured to acquire, from an image source, a target image as a target of resolution conversion; a second acquisition unit configured to acquire an additional image from the image source, or including the target image; an estimation unit configured to estimate a corresponding point in the target image using a plurality of corresponding point estimation methods, the corresponding point being associated with at least one pixel in the additional image to obtain a plurality of corresponding points in the target image; a setting unit configured to set a pixel value of each pixel included in the additional image as a sampling value for the corresponding point when each pixel is set as a target pixel, to obtain a plurality of sampling values for pixels included in the additional image; and a generation unit configured to generate an image of a first resolution into which a second resolution of the target image is converted, using pixel values and positions of a plurality of pixels included in the target image, and the sampling values and positions of the corresponding points.

DETAILED DESCRIPTION OF THE INVENTION

A resolution conversion apparatus according to an embodiment of the invention will be described in detail with reference to the accompanying drawings.

(Outline)

In the prior art, it is an implicit understanding that a unique association is obtained from motion estimation. Therefore, to execute more accurate magnification processing, it is attempted to highly accurately associate each position in a certain frame with the corresponding position in a reference frame. One-to-one association between the frames is correct as a physical phenomenon. However, in light of, for example, the aperture problem, it is not always needed to realize one-to-one association. The aperture problem means that where identical local patterns exist in an image, they can correspond to a certain local pattern, i.e., one-to-many association can occur. The aperture problem is disadvantageous to accurately estimate motion of each object in an image. However, resolution conversion does not aim to estimate the accurate motion. If a plurality of association relations that can occur are all used for resolution conversion, a plurality of local patterns, which cause the aperture problem, contribute to enhancement of the accuracy of an output image.

When motion vector estimation is performed concerning an image, using a plurality of motion estimation methods, different motion vectors are usually obtained because of the influence of the aperture problem or noise. Some estimated motion vectors significantly contribute to the enhancement of the accuracy of an output image, and other estimated motion vectors do not significantly contribute to it. It depends upon the image and motion estimation method employed, whether motion vectors that significantly contribute to the enhancement of the accuracy of an output image can be acquired.

Figure 1:
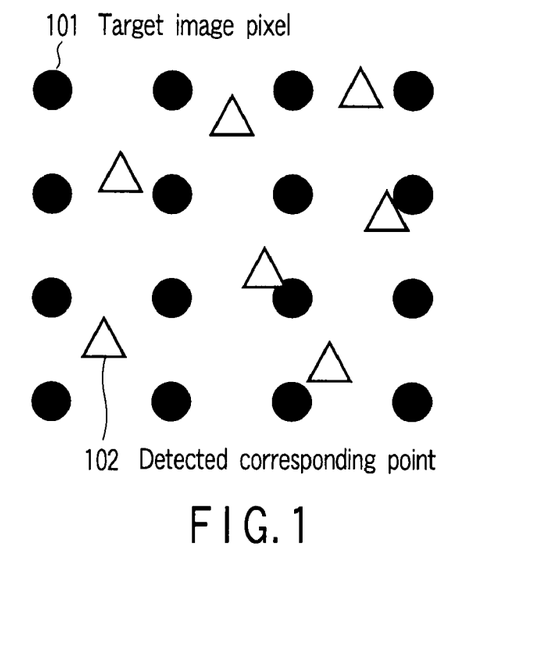
FIG. 1 is a view illustrating corresponding points detected by a certain single corresponding point estimation method.
Figure 2:
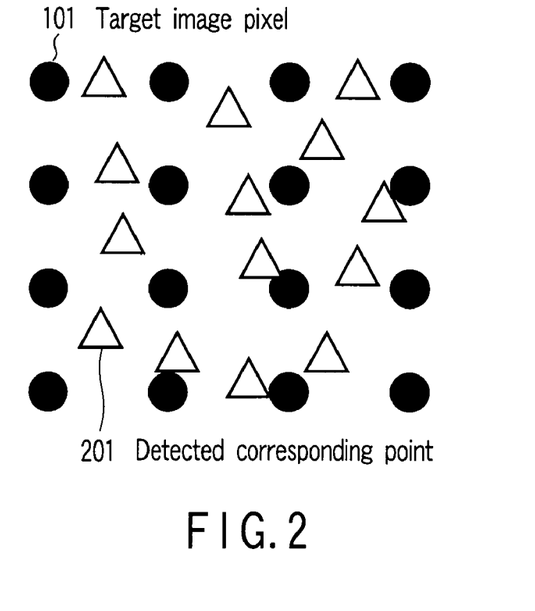
FIG. 2 is a view illustrating corresponding points detected by a plurality of corresponding point estimation methods.
Figure 3:
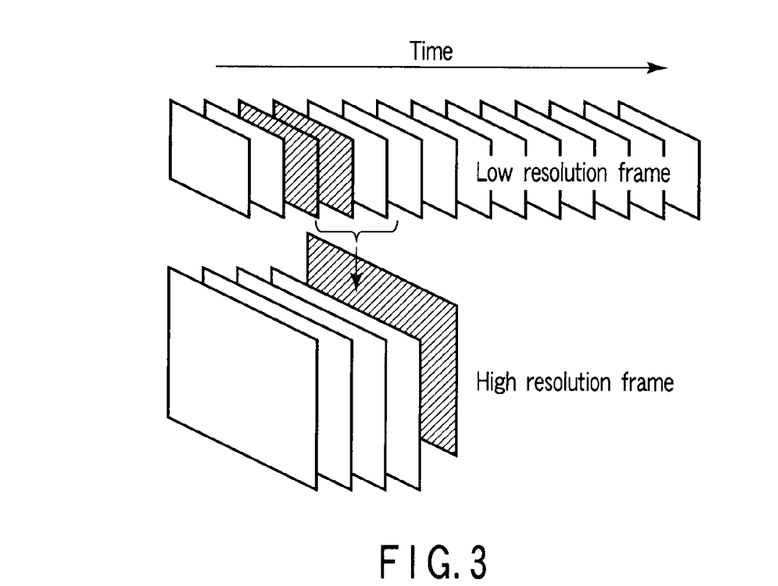
FIG. 3 is a view useful in explaining the way of acquiring a high-resolution frame by resolution conversion using two frames.

In the embodiment, one-to-many association obtained by a plurality of motion estimation methods is utilized. In view of the implicit understanding that only one result is acquired from one motion estimation, motion estimation is not performed in the embodiment. Therefore, for convenience sake, estimation of one-to-many association will be called "corresponding point estimation." When association relations are estimated using a plurality of corresponding point estimation methods, association relations between one pixel in a frame and a plurality of points in a reference frame can be acquired. If a corresponding point 102 is acquired by a certain corresponding point estimation method as shown in FIG. 1, a corresponding point 201 can be added as shown in FIG. 2 in the case where one-to-many association by a plurality of corresponding point estimation methods is employed. In this case, to obtain a high-resolution image using the thus-acquired corresponding points, sampling values corresponding to all association relations are distributed to execute degradation inverse conversion. For example, in the embodiment, two corresponding point estimation methods having different characteristics may be prepared, and first and second corresponding point estimation methods be applied to first and second frames, respectively, thereby acquiring a plurality of one-to-one association relations and combining them for realizing degradation inverse conversion. The embodiment thus carries out a magnification process, using one-to-many association realized by a plurality of corresponding point estimation methods.

A resolution conversion apparatus, method and program according to the embodiment can provide a more accurate high-resolution image than that obtained by a single motion estimation method.

(Entire Configuration)

Figure 4:
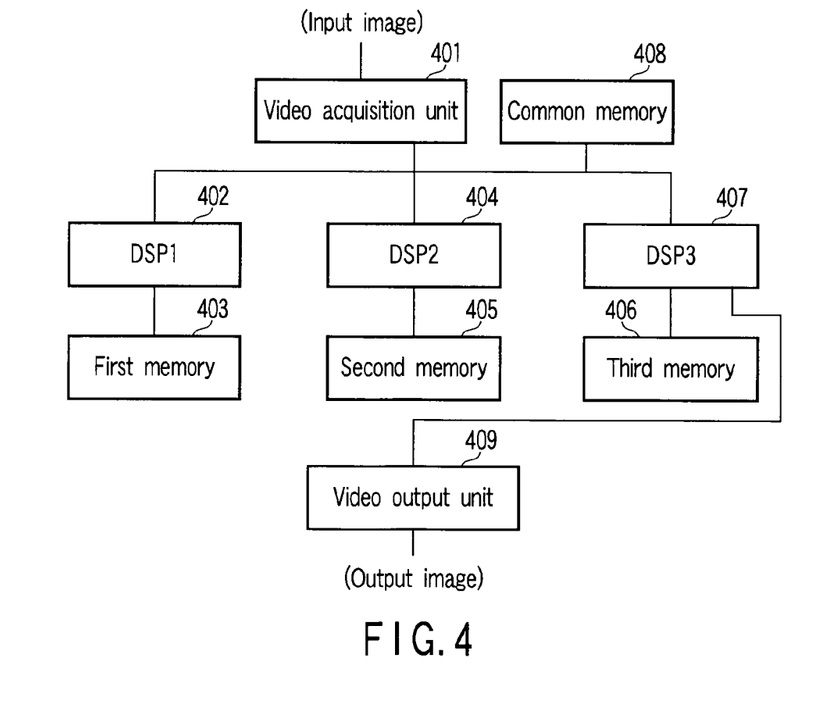
FIG. 4 is a block diagram illustrating an example of a resolution conversion apparatus according to an embodiment.
Figure 5:
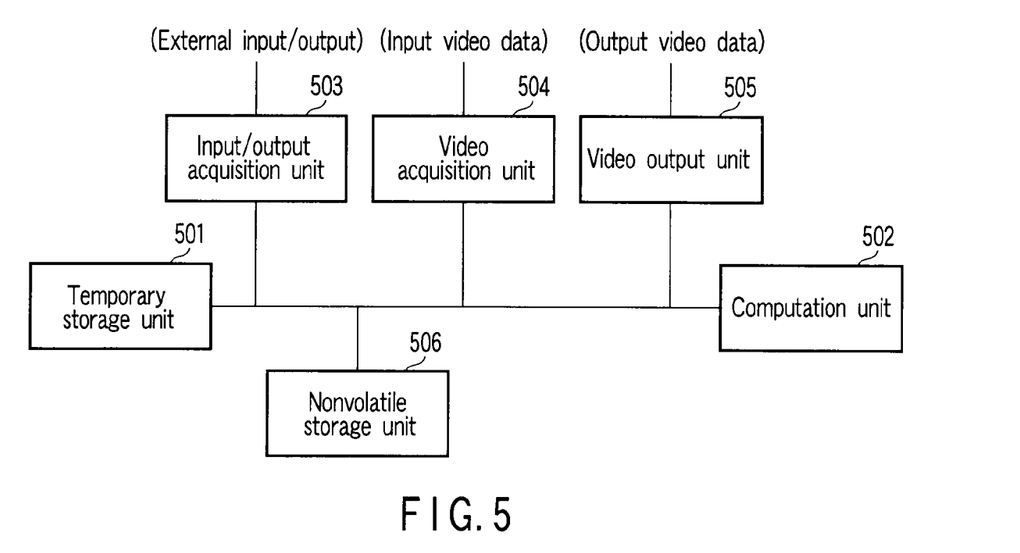
FIG. 5 is a block diagram illustrating another example of the resolution conversion apparatus according to the embodiment.

Referring first to FIG. 4, the resolution conversion apparatus of the embodiment will be described. FIG. 4 shows a chip structure as a circuit example of the resolution conversion apparatus. FIG. 5 shows another circuit example, described later, in which the resolution conversion apparatus is realized by software employed in a versatile CPU, as in a personal computer, TV set or DVD recorder. In the case of FIG. 4, if each DSP is realized not by a circuit, such as ASIC or FPGA, but by software, a ROM storing a program is prepared, or a program is beforehand stored into a memory for each DSP. In the case of FIG. 5, a program is transferred from a nonvolatile storage unit 506 to a temporary storage unit 501.

As shown in FIG. 4, the resolution conversion apparatus of the embodiment comprises a video acquisition unit 401, DSP1 402, first memory 403, DSP2 404, second memory 405, third memory 406, DSP3 407, common memory 408 and video output unit 409.

The video acquisition unit 401 acquires, typically, a plurality of images, i.e., image data items (in the case of a motion picture, frames, i.e., frame data items) from a video source. For convenience, one of the acquired images to be resolution-converted will be referred to as a target image, and the other images will be referred to additional images. However, the additional images may be the same as the target image. The video source can be a nonvolatile memory. It can also be the captured data from a camera, video or hard disk.

The first, second and third memories 403, 405 and 406 stores image data acquired from the video acquisition unit 401, and are used as the work areas of the DSP1 402, DSP2 404 and DSP3 407, respectively.

The common memory 408 stores image data acquired from the video acquisition unit 401. A DSP may instruct the common memory to do the storing operation. Alternatively, a DMA circuit may be prepared to do it. The common memory 408 has an exclusive control function for enabling all DSPs to access the memory itself.

The DSP1 402, DSP2 404 and DSP3 407 read image data from the common memory 408 when they need it. Further, when the first, second and third memories store image data items, the DSP1 402, DSP2 404 and DSP3 407 read them from the first, second and third memories, respectively. The DSP1 402 and DSP2 404 contain respective corresponding point estimation programs for acquiring points associated with pixels. The DSP1 402 and DSP2 404 write the acquired corresponding points to the third memory 406 or common memory 408. When a corresponding point is written to the common memory 408, the DSP3 407 reads the corresponding point from the common memory 408 when necessary. Further, when three or more corresponding point estimation methods are employed, another DSP (not shown) may be prepared, or one of the existing DSPs may execute two or more corresponding point estimation methods. The DSP3 407 contains a degradation inverse conversion program, and performs resolution conversion based on degradation inverse conversion by this program, using already computed corresponding points. The video data obtained by the conversion is transferred to the video output unit 409.

The video output unit 409 outputs a resolution-converted image. For example, the video output unit 409 outputs the image to an external output device via video output means, where the image is displayed. The video output unit 409 may store images in a nonvolatile memory such as a hard disk.

As shown in FIG. 5, another type of resolution conversion apparatus comprises a temporary storage unit 501, computation unit 502, input/output acquisition unit 503, video acquisition unit 504, video output unit 505 and nonvolatile storage unit 506.

The video acquisition unit 504 is similar to the video acquisition unit 401. Namely, the video acquisition unit 504 acquires, typically, a plurality of images, i.e., image data items (in the case of a motion picture, frames, i.e., frame data items) from a video source.

The temporary storage unit 501 temporarily stores the image acquired by the video acquisition unit 504. The instruction to perform storage may be issued by the computation unit 502 or a DMA circuit separately prepared. The temporary storage unit 501 stores a plurality of corresponding point estimation programs, and stores the results of execution of the computation unit 502.

The computation unit 502 can execute the corresponding point estimation programs stored in the temporary storage unit 501, and a degradation inverse conversion program.

The input/output acquisition unit 503 transfers/receives data to/from input means, such as a keyboard, mouse or remote controller, DVD output means, and audio output means.

The nonvolatile storage unit 506 stores video data and serves as a video source. The nonvolatile storage unit 506 is, for example, a hard disk.

The example of FIG. 5 is suitable for, for example, a system provided with a personal computer that includes means such as a keyboard or mouse, and a video recorder that includes a remote control input terminal, DVD input/output terminals and audio output terminal. Users can, for example, start resolution conversion using the keyboard, mouse or remote controller.

Figure 6:
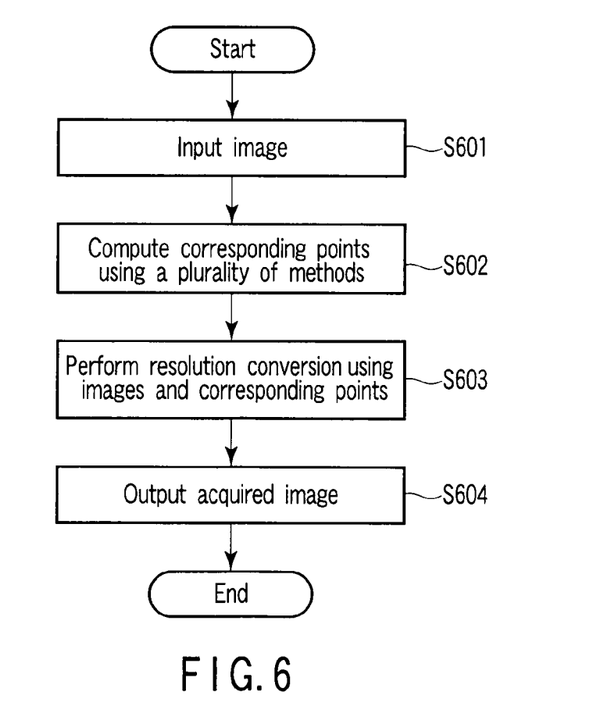
FIG. 6 is a flowchart illustrating an operation example of the resolution conversion apparatus of FIG. 4 or 5.

Referring then to FIG. 6, a description will be given of an operation example of the resolution conversion apparatus of FIG. 4 or 5.

At step S601, the video acquisition unit 401 or 504 acquires image data. In the case of FIG. 4, the video acquisition unit 401 directly copies the acquired image data to the memories 403, 405 and 406 for the respective DSPs, or writes it to the common memory 408. In the latter case, each DSP reads the data from the common memory 408 when necessary. The common memory 408 has an exclusive control function for allowing all DSPs to access.

In the case of FIG. 5, the image acquired by the video acquisition unit 504 is copied to the temporary storage unit 501. This copying process may be executed under the control of the computation unit 502 or any DSP (not shown), or a DMA circuit separately prepared. Further, video data stored in the nonvolatile storage unit 506, such as a hard disk, may be acquired instead of data from a camera or video recorder.

At step S602, two or more corresponding point estimation methods are prepared, and points associated with each pixel are obtained using the methods. In the case of FIG. 4, for example, the DSP1 402 and DSP2 404 execute the first and second corresponding point estimation methods to obtain corresponding points, using the memories (403, 405) as work areas, respectively. The corresponding point information thus obtained may be directly written to the memory 406 for the DSP3 407, if possible. Alternatively, it may be written to the common memory 408, and is read therefrom when the DSP3 requires it. If three or more corresponding point estimation methods are employed, another DSP (not shown) may be prepared, or one of the DSPs may execute a plurality of corresponding point estimation methods.

In the case of FIG. 5, the computation unit 502 and temporary storage unit 501 are used to execute programs for providing corresponding point estimation methods, and the temporary storage unit 501 stores the result of program execution.

At step S603, the corresponding point information acquired at step S602 is used to execute resolution conversion using degradation inverse conversion. In the case of FIG. 4, the DSP3 407, for example, executes degradation inverse conversion using the memory 406 for the DSP3 as a work area, and sends the result of conversion to the video output unit 409.

In the case of FIG. 5, the computation unit 502 and temporary storage unit 501 are used to execute a program for providing the reconstruction-based super resolution, and to send the result of conversion to the video output unit 505.

At step S604, the image obtained by resolution conversion is output. For instance, the video output unit 409 outputs the conversion result to a video display unit (not shown) as an external output device, where it is displayed as an image. Alternatively, the resultant video image may be stored in the nonvolatile storage unit 506 such as a hard disk.

When each frame of a motion picture is subjected to resolution conversion, the steps S601 to S604 are iterated, with image frames, which are used as target images and additional images, sequentially shifted in a time-sequence manner.

Figure 7:
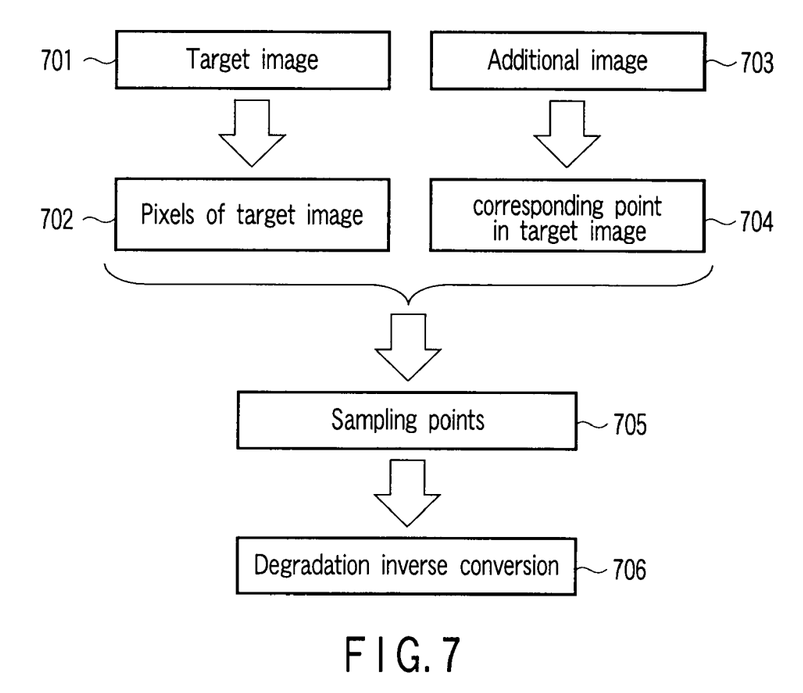
FIG. 7 is a view illustrating the relationship between certain terms used in the embodiment.

FIG. 7 shows the relationship between the main terms used in the embodiment.

Since an image (target image 701) as a resolution conversion target is given, the pixel value of each pixel of the image is known. Further, when points 704 in the target image, which are associated with pixels of an image given as an additional image 703, are detected, the pixel values of the pixels of the additional image can be assigned to the detected corresponding points 704. Pixel 702 in the target image and the corresponding points 704 in the target image will hereinafter collectively be referred to as sampling points 705. The thus-obtained sampling points 705 are subjected to degradation inverse conversion. Lastly, degradation inverse conversion 706 (POCS or MAP) is performed, using information concerning the sampling points 705 (i.e., the positions and sampling values of the sampling points), with the result that a resolution-converted image is estimated, and the estimated image is output.

Corresponding point estimation methods will now be described in detail.

(Example of One-to-One Motion Estimation Method: Block Matching)

As a first example of the corresponding point estimation method, a method obtained by combining block matching and function fitting exists. In this method, block matching is performed concerning a displacement of each integer position, and function fitting is performed on each position around the thus-obtained positions, using an error curve, thereby setting the minimal position of the error curve as a subpixel displacement. Block matching is a method of detecting an area in a second frame, which is similar to a template area set in a first frame. More specifically, firstly, an appropriate search range is set in the second frame, then the areas having the same shape as the template area are sequentially extracted from the search range, and one of the areas, in which the sum (hereinafter referred to as a "block error") of errors in pixel value with respect to the template area is minimum, is acquired to detect the corresponding position. The template area may be set as, for example, a square, rectangular, circular or semi-regular area using, as the center, a pixel, the corresponding sampling point of which is to be obtained (in the embodiment, areas other than rectangular ones will be called blocks).

Figure 8:
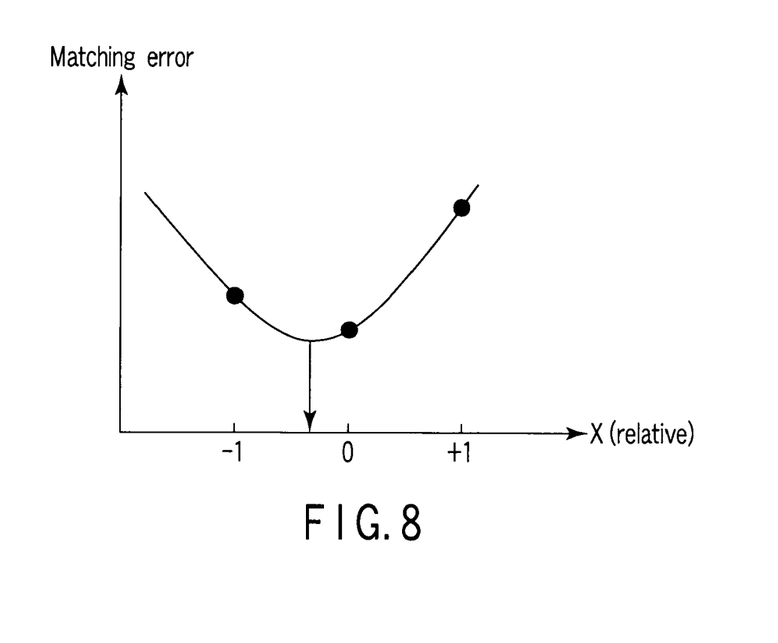
FIG. 8 is a view illustrating a parabola fitting method.

The range of a search can be set to an area that includes, as its central portion, the portion corresponding to the template area in the first frame. As the block error, Sum of Squared Distance (SSD: the sum of the squared distance of the pixel values of pixels), Sum of Absolute Distance (SAD: the sum of the absolute distance of the pixel values of pixels), or a similarity, such as normalized cross correlation, can be used. Suppose here that I(p, q, t) represents the brightness I of a pixel (p, q) at time t, and (Δp, Δq) represents the motion vector of the pixel (p, q) at time t with respect to time t+Δt, SSD and SAD can be given by $$SSD = \sum_{(p,q)\in block} (I(p, q, t) - I(p + \Delta p, q + \Delta q, t + \Delta t))^2$$

$$SAD = \sum_{(p,q)\in block} |I(p, q, t) - I(p + \Delta p, q + \Delta q, t + \Delta t)|$$

where "block" indicates a block used for error estimation in block matching. Function fitting is a method of estimating a subpixel displacement based on the block error of the position acquired by block matching, and the block error of each position around the first-mentioned position. More specifically, when, for example, SSD is used as the block error, if it is supposed that the error curve is of the second order, a one-dimensional subpixel displacement can be shown in FIG. 8 and given by the following equation:

$$\text{subpixel} = \frac{E(1) - E(-1)}{2\{2E(0) - E(1) - E(-1)\}}$$

The motion vector obtained after position modification is Δp+subpixel.

When SAD is used as the block error, if it is supposed that the error curve is expressed by an absolute value function, the following equations are given:

$$\text{subpixel} = \begin{cases} \dfrac{E(-1) - E(1)}{2\{E(1) - E(0)\}} & E(-1) <= E(1) \\ \dfrac{E(-1) - E(1)}{2\{E(-1) - E(0)\}} & E(-1) > E(1) \end{cases}$$

where <= indicates ≦. If the above one-dimensional subpixel estimation is applied to horizontal and vertical estimation, two-dimensional subpixel displacements estimation can be obtained. Alternatively, when, for example, SSD is utilized, and the error curve is applied to two-dimensional subpixel displacements, it can be assumed that the two-dimensional subpixel displacements (δx, δy) satisfy the following equation:

$$a\delta x^2 + b\delta y^2 + c\delta x \delta y + d\delta x + e\delta y + f = SSD$$

If the actually measured SSD values are imparted as δx and δy to each of nine points falling in a range of −1 to +1 to thereby compute least square solutions concerning coefficients a to f, or if they are imparted to appropriate six points to compute solutions for the coefficients a to f, the two-dimensional subpixel displacements can be estimated by solving two equations concerning (δx, δy) obtained at partial differential=0. There has been proposed another method of simultaneously estimating two-dimensional displacements using an equation for a one-dimensional subpixel displacement (see, for instance, Shimizu and Okutomi, "Two-dimensional simultaneous subpixel estimation method," Institute of Electronics, Information and Communication Engineers Transaction on Information and Systems D-II, Vol. J87-D-II, No. 2, pp. 554-564, 2004, in Japanese).

(Example of One-to-One Motion Estimation Method: Example of Intra-Frame Motion Estimation Method)

A method of obtaining corresponding points between frames using block matching and function fitting has been described above. In the meantime, in a portion in which the Aperture problem occurs, e.g. in the outline portion of a substance, congruent local patterns may well exist in the same frame. In this case, it contributes to estimation of an accurate high-resolution image using resolution conversion to detect corresponding points in the same frame.

A method example of detecting corresponding points in a single frame using block matching and function fitting, as a second example of the corresponding point estimation method, will now be described.

Figure 9:
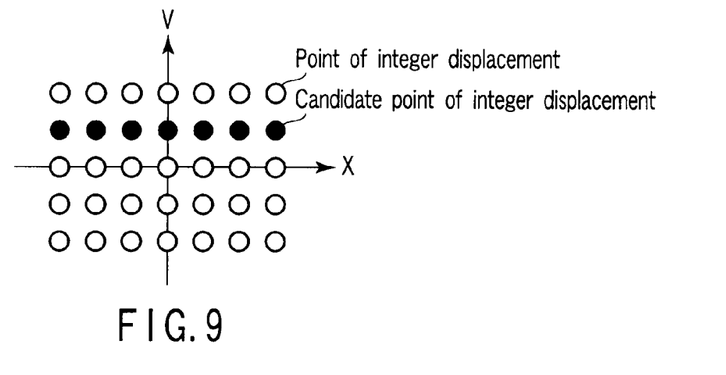
FIG. 9 is a view illustrating a horizontal first candidate line used when corresponding points are detected in a frame.
Figure 10:
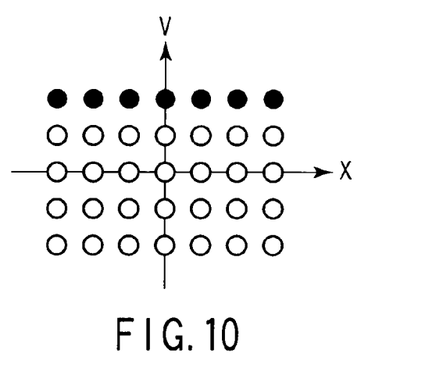
FIG. 10 is a view illustrating a horizontal second candidate line used when corresponding points are detected in a frame.
Figure 11:
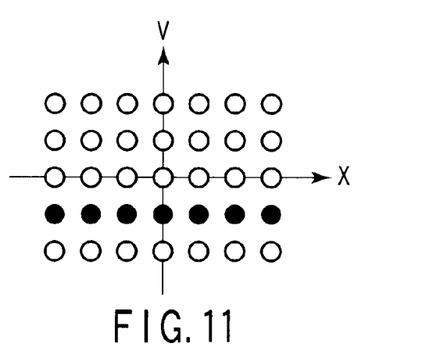
FIG. 11 is a view illustrating a horizontal third candidate line used when corresponding points are detected in a frame.
Figure 12:
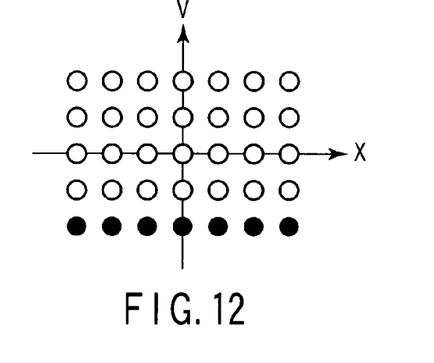
FIG. 12 is a view illustrating a horizontal fourth candidate line used when corresponding points are detected in a frame.
Figure 13:
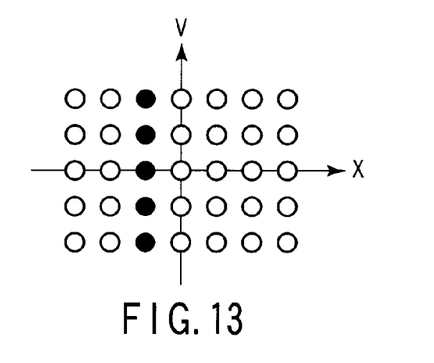
FIG. 13 is a view illustrating a vertical candidate line used when corresponding points are detected in a frame.

When congruent local patterns exist in a single frame, they may well exist around a set template. Further, points associated with a template itself have no meaning as corresponding points. In view of these points, it is considered that corresponding points concerning most of pixels that provide congruent local patterns can be obtained efficiently if a search is performed, using block matching, in a preset direction, for example, horizontally (FIG. 9) or vertically (FIG. 13), and function fitting is performed lastly to detect displacements. Further, if such a local pattern can be approximated using a linear line, such as the outline of a substance, it can be estimated in which direction a search should be performed to detect an edge. The orientation of an edge can be determined from the ratio of the value of an edge detection filter to the horizontal and vertical lines. Therefore, if the output value of, for example, a first-order difference filter or Sobel filter as the edge detection filter is computed, and the above-mentioned ratio is computed, it can be estimated to which one of the horizontal and vertical lines, the orientation of an edge approximates, if a local pattern can be approximated by a linear line. If it is determined that the orientation of the edge approximates to the vertical line, a search is performed as shown in FIG. 9, while if it is determined that the orientation of the edge approximates to the horizontal line, a search is performed as shown in FIG. 13. As a result, the ranges of SSD or SAD values become larger, and hence more accurate displacements can be obtained. When it is determined that the orientation of an edge approximates to the vertical line to thereby perform a search as shown in FIG. 9, if searches concerning lines as shown in FIGS. 10, 11 and 12 are performed as well, a larger number of corresponding points can be obtained.

Figure 14:
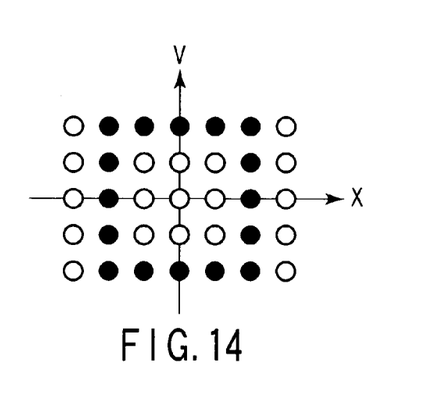
FIG. 14 is a view illustrating a rectangular candidate line used when corresponding points are detected in a frame.

Further, the following search may be carried out instead of estimating the orientation of an edge using the edge detection filter. If block matching is performed concerning peripheral pixels as shown in FIG. 14, optimal peripheral displacements can be obtained. If a displacement is detected during a horizontal search (as shown in FIG. 10 or 12), the horizontal search is continued. If a displacement is detected during a vertical search, the vertical search is continued. If displacements are detected at four corners, a horizontal or vertical search may be carried out, or a search may be carried out using 45 degree displacement candidates.

(Example of One-to-Many Motion Estimation Method)

Since the embodiment employs a one-to-many association relationship, the corresponding point estimation method may not always estimate a one-to-one association relationship. As a third example of the corresponding point estimation method, a method of obtaining one-to-many corresponding points can be contrived, in which a method of obtaining corresponding points between frames using block matching and function fitting is firstly applied to detect an optimal displacement, and then a search is executed on, for example, a line around the displacement, using the same method as that for computing corresponding points in a single frame, thereby detecting one-to-many corresponding points. Using this method, one-to-many corresponding points can also be detected between frames. In the above-mentioned method of searching for corresponding points in a single frame, one-to-many corresponding points are detected.

(Modification of One-to-Many Motion Estimation Method)

There are other corresponding point estimation methods, such as global motion estimation and layer motion estimation mentioned in the section "Description of the Related Art." These methods enable one-to-one corresponding point estimation to be performed, and the execution results of the methods can be utilized in the embodiment. Global motion estimation also includes the following method, as well as block matching described in the section "Description of the Related Art." In the method hereinafter described, assume that the motion of the entire portions of first and second image frames is uniform, and coordinate transform indicating the motion is expressed by a parameter vector m (for example, affine transform). The error function of a column vector m will now be defined.

$$f(m) = \sum_i \{f_i(m)\}^2$$

The above error function indicates the sum (which is given by $f_i(m)$) of brightness errors in $i^{th}$ pixels between the second image frame and an image obtained by performing, on the first image frame, coordinate conversion corresponding to the vector m.

If $m = m_0 + \Delta m_0$, the first-order approximation of the Taylor series of $f_i(m)$ with respect to $m_0$ is given by $$f_i(m) = f_i(m_0) + D_i(m_0) \Delta m_0$$

where $D_i(m)$ indicates the following:

$$D_i(m) = \partial f_i(m) \Delta m$$

Namely, $D_i(m)$ is a row vector indicating the derivative of $f_i$ at m. When the result of the above Taylor series is assigned to the following equation, and the derivative of $f_i$ at m is set to 0, $$f(m) = \sum_i \{f_i(m)\}^2$$

the following equation for estimating $\Delta m_0$ is given $$\Delta m_0 = -\left(\sum_i H(f_i)\right)\left(\sum_i D_i^T f_i(m_0)\right)$$

where H(f) is a Hesse matrix related to f.

Since $\Delta m_0$ is the updated value of the Gauss-Newton method, if an appropriate m, for example, a vector indicating no motion, is set to $m_0$, $\Delta m_0$ is computed as $m_0$, and is added to $m_0$. By repeating these steps, parameters for global motion can be acquired.

By attempting to detect corresponding points using such various methods as described above, a lot of corresponding points can be obtained. By integrating these points and also utilizing a one-to-many corresponding point relationship, the possibility of acquiring corresponding points that can contribute to accuracy of high-resolution images is enhanced.

In particular, one influential method that can be expected to contribute to accuracy of high-resolution images is a combination of a large-area corresponding point estimation method and local-area corresponding point estimation method. For instance, a large-area corresponding point estimation method, such as global motion or layer estimation, can provide corresponding points with high estimation accuracy, if a model assumed as a motion accords with an image subjected to estimation, corresponding points can be obtained with high estimation accuracy. However, if they do not accord with each other, satisfactory corresponding points cannot be obtained.

If local corresponding point estimation, such as block matching, function fitting or Lucas-Kanade scheme, is performed, relatively satisfactory corresponding points can be obtained in any type of images, although the estimation accuracy of corresponding points is lower than that of the large-area method.

The above-mentioned methods can be expected to compensate for their respective defects, and hence their combination can be expected to contribute to enhancement of the accuracy of high-resolution images. The terms "large area" and "local area" are used when, for example, the largest one of a plurality of areas used for large-area motion estimation as the first corresponding point estimation method is twice or more the largest one (largest block size in the case of block matching) of a plurality of areas used for local-area motion estimation as the second corresponding point estimation method.

(Example of Degradation Inverse Conversion)

Any one of the reconstruction-based super resolutions that have been proposed in S. C. Park et al., "Super-Resolution Image Reconstruction: A Technical Overview," IEEE Signal Processing Magazine, pp. 21-36, May 2003, can be used at step S603. A description will be given of degradation inverse conversion using POCS, as an example of the methods.

In POCS, firstly, a certain interpolation method (e.g., a bilinear method, bi-cubic method, cubic convolution method) is applied to a conversion target frame as a target image, thereby imparting provisional pixel values to respective pixels of a high resolution image. Provisional pixel values imparted to a high resolution image will hereinafter be referred to simply as provisional pixel values. Further, sampling values obtained from respective pixel positions of low resolution images (target image and additional image) when corresponding provisional pixel values are used for the pixel positions are computed. These sampling values will hereinafter be referred to as provisional sampling values. The term "pixel value" indicates a value that represents a distribution of brightness levels in each rectangle included in a plurality of rectangles into which the screen is divided in accordance with a sampling pitch, and substantially indicates the brightness of the center of each rectangle. The ratio in the size of each rectangle between input and output images is determined from the density of the pixels contained therein. For instance, when the lengthwise/widthwise resolution of the image becomes ½, the length/width of each rectangle is doubled.

When provisional pixel values are imparted to a high resolution image, the provisional sampling value of each pixel of each low resolution image (target image/additional image) is obtained by computing the weighted average of the provisional pixel values of the high resolution image that have been used to sample pixel values of each low resolution image (target image/additional image). At this time, if the high resolution image is an accurate one, the provisional sampling values are equal to the pixel values of each low resolution image (target image/additional image) obtained by photography. Actually, however, they are unequal in many cases. Therefore, the provisional pixel values of the high resolution image are updated so that the provisional sampling values become equal to the pixel values of each low resolution image. More specifically, the difference between a certain pixel value of a low resolution image (target image) and the corresponding provisional sampling value is detected, and addition/subtraction is executed on provisional pixel values of a high resolution image to reduce the difference. Since a high resolution image has a plurality of provisional pixel values corresponding to each pixel value of a low resolution image, the above-mentioned difference is classified into differences based on the weights used during sampling, and addition/subtraction of the resultant differences and each provisional pixel value is performed. As a result of the addition/subtraction, the aforementioned pixel value of the low resolution image approaches the corresponding provisional sampling value. Such addition/subtraction as this may increase the difference between another pixel value of the low resolution image and the corresponding provisional sampling value. However, it is empirically known that when the above operation is performed on a large number of pixels, most pixel values will approach the corresponding provisional sampling values. In resolution conversion, the above operation is repeated on the entire low resolution image a preset number of times, and resultant provisional pixel values of a high resolution image are output.

Concerning the cubic convolution method, see R. G. Keys, "Cubic Convolution Interpolation for Digital Image Processing," IEEE Transactions on Acoustics, Speech, and Signal Processing, vol. ASSP-29, no. 6, 1981.

(Reliability)

Figure 15:
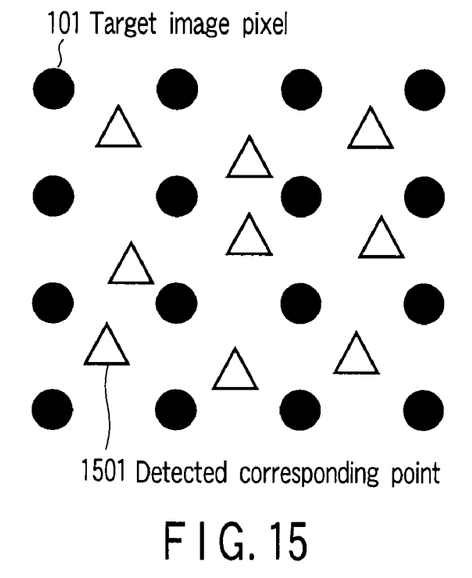
FIG. 15 is a view illustrating an example of a corresponding point pattern that greatly contributes to enhancement of accuracy of an output image.
Figure 16:
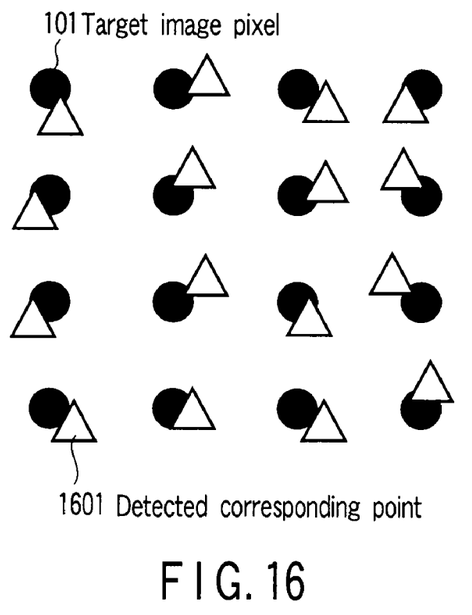
FIG. 16 is a view illustrating an example of a corresponding point pattern that does not greatly contribute to enhancement of accuracy of an output image.

The inventors of the present invention made experiments and found that corresponding points as shown in FIG. 15, which are positioned between pixels, significantly contribute to enhancement of the accuracy of a high resolution image obtained by conversion, whereas the degree of contribution of corresponding points as shown in FIG. 16, which are positioned very close to already known pixels, is lower than that of the first-mentioned corresponding points, although they also contribute to the enhancement. Further, it is generally known to be difficult to perform accurate corresponding point estimation, and errors of certain degrees remain in the thus-obtained corresponding points.

Although a greater number of corresponding points positioned between pixels should be used for generating a high resolution image, it seems to be desirable that corresponding points close to already known pixels, which do not significantly contribute to enhancement of the accuracy of a high resolution image, be eliminated in consideration of the fact that they contain errors. It seems to be also desirable that corresponding points of low reliability be eliminated even when they are positioned between pixels.

Figure 17:
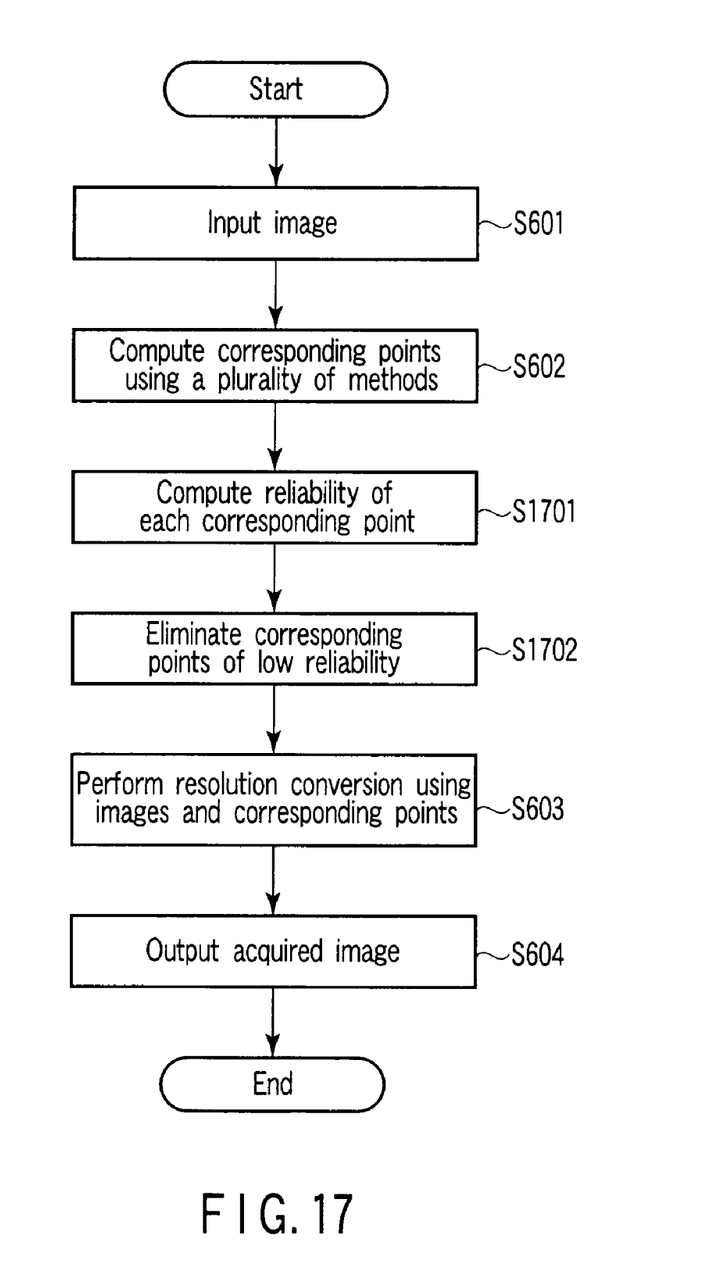
FIG. 17 is a flowchart useful in explaining an operation example using the degree of reliability of the resolution conversion apparatus of FIG. 4 or 5.

In view of the above, in the following example, computation of the degree of reliability, and removal of unnecessary corresponding points based on the computed reliability degree are executed as shown in the flowchart of FIG. 17. Specifically, the following two steps are added between the previously described steps S602 and S603 of FIG. 6. These steps are executed by, for example, the DSP3 407 and computation unit 502.

S1701: The degree of reliability of each corresponding point is computed.

S1702: Unnecessary corresponding points are eliminated based on the degree of reliability of each corresponding point. Specifically, corresponding points with degrees of reliability lower than a preset value, for example, are eliminated. Alternatively, each image is divided into a plurality of blocks with an appropriate interval (which corresponds to, for example, one pixel of a resolution-converted image) between each pair of adjacent blocks. In each block, corresponding points are sorted based on their degrees of reliability, and only some corresponding points of higher degrees of reliability are left, with the other points eliminated. The number of corresponding points to be left is set beforehand.

As the degree of reliability, the degree of difference (the lower the degree of difference, the higher the degree of reliability), such as SSD or SAD, or the degree of similarity, such as normalized cross-correlation, can be used for each block of a preset size (for example, a size of 5×5 pixels) that includes a corresponding point as the central point. Alternatively, the value obtained by dividing an SSD or SAD value by the variance or standard deviation of the pixel values included in each block may be used. When the degree of reliability can be output using on the corresponding point estimation method, it may be used. For instance, if the Lucas-Kanade method is used as the corresponding point estimation method, and the determinants of the Hesse matrix are used as degrees of reliability, corresponding points of low inverse-matrix reliability can be eliminated. Since corresponding points are non-integer pixels, linear interpolation or cubic convolution interpolation to interpolate intensities when computing SSD or SAD values. When the degree of similarity is used as the degree of reliability, the former may be converted into a value that is determined to be more reliable when the value is higher, using a method in which the value is multiplied by −1, or the value −exp (−SSD/VSSD) is computed using VSSD as a constant. Alternatively, at step S1702, corresponding points having degrees of reliability less than a preset value may be eliminated.

The following equation may be used as another parameter of reliability:

$$\text{Reliability}=\alpha \cdot d+\beta \cdot e$$

where d: Distance between each sampling point and another sampling point closest to the former (Assume here that "sampling points" mean the corresponding points and the pixels of a frame as a resolution conversion target.)

e: Error between close local patterns including each corresponding point, for example, the SSD of a block including each corresponding point as the center; or the degree of reliability output based on the corresponding point estimation method α, β: Preset weight constants It is empirically known that corresponding points that contribute to enhancement of accuracy of an output image obtained by resolution conversion are those positioned between known corresponding points as shown in FIG. 15. In contrast, corresponding points very close to known corresponding points as shown in FIG. 16 do not significantly contribute to enhancement of accuracy of an output image. Accordingly, if the distance (L1 or L2) between each sampling point and another sampling point closest thereto is obtained, and the sampling points, the distances of which to their respective closest ones are relatively long, are left, elimination of corresponding points that contribute to enhancement of accuracy of an output image can be minimized. Therefore, as one method, the distance between each sampling point and its closest sampling point is directly used as the degree of reliability. Further, if α·d is added to the degree of reliability, and both the resultant degree of reliability and the degree of reliability obtained by corresponding point estimation are considered, it can be realized that the greater the above-mentioned distance and the higher the reliability of each corresponding point itself, the less the possibility of elimination of said each corresponding point. Furthermore, weight coefficients can be used to balance them.

(Modification: Processing Performed in Units of Frame Lines in the Apparatus)

In the above embodiment, image data is processed in units of frames. However, when, for example, each DSP memory 403, 405 and 406 in the circuit of FIG. 4 are formed of a RAM that operates at high speed but has a small capacity, and the common memory 408 is formed of a RAM that operates at low speed but has a large capacity, it is difficult to store image data of several frames in each DSP memory. In this case, if processing is performed in units of several to several tens lines, the above-described resolution conversion can be realized even by memories of small capacity.

The above-described embodiment and modification, which employ a plurality of corresponding point estimation methods, can provide a high resolution image of high accuracy based on resolution conversion.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A resolution conversion apparatus comprising:
    a first acquisition unit configured to acquire, from an image source, a target image as a target of resolution conversion;
    a second acquisition unit configured to acquire an additional image from the image source;
    an estimation unit configured to estimate a corresponding point in the target image using a plurality of corresponding point estimation methods, the corresponding point being associated with at least one pixel in the additional image to obtain a plurality of corresponding points in the target image;
    a setting unit configured to set a pixel value of each pixel included in the additional image as a sampling value for the corresponding point when each pixel is set as a target pixel, to obtain a plurality of sampling values for pixels included in the additional image; and
    a generation unit configured to generate an image of a first resolution into which a second resolution of the target image is converted, using pixel values and positions of a plurality of pixels included in the target image, and the sampling values and positions of the corresponding points.

2. The apparatus according to claim 1, wherein the second acquisition unit configured to acquire the additional image including an image other than the target image.

3. The apparatus according to claim 1, wherein the estimation unit performs, using the corresponding point estimation methods, corresponding point estimation for estimating the corresponding points, the corresponding points corresponding to a plurality of target image regions closest to a local pattern that is included in each of target image regions sequentially set when the pixels included in the additional image are sequentially set as a target pixel.

4. The apparatus according to claim 1, wherein the estimation unit performs corresponding point estimation, using, as the corresponding point estimation methods, a first corresponding point estimation method in which a single image is used as both the target image and the additional image, and a second corresponding point estimation method in which different images are used as the target image and the additional image.

5. The apparatus according to claim 1, wherein the estimation unit estimates respective corresponding points associated with a single target pixel, using the corresponding point estimation methods, and estimates not less than two corresponding points associated with at least one target pixel.

6. The apparatus according to claim 5, wherein the estimation unit performs corresponding point estimation, using a first corresponding point estimation method and a second corresponding point estimation method that are included in the corresponding point estimation methods, a largest one of target image regions employed in the first corresponding point estimation method being not less than twice a largest one of target image regions employed in the second corresponding point estimation method.

7. The apparatus according to claim 1, further comprising:
a computation unit configured to compute a degree of reliability of each of the corresponding points, the degree of reliability indicating a degree of contribution to high resolution; and
a ranking unit configured to rank the corresponding points based on the degree of reliability of each corresponding point, and eliminate those of the corresponding points that are ranked below a preset rank.

8. The apparatus according to claim 7, wherein the computation unit employs, as the degree of reliability of a certain associated point, a weighted sum of a distance between the certain corresponding point and a sampling point that is included in sampling points other than the certain corresponding point and is closest to the certain corresponding point, and an error between local patterns around the certain corresponding point.

9. The apparatus according to claim 1, further comprising:
a computation unit configured to compute a degree of reliability of each of the corresponding points, the degree of reliability indicating a degree of contribution to high resolution; and
an elimination unit configured to eliminate each corresponding point if the degree of reliability of each corresponding point is not more than a preset value.

10. The apparatus according to claim 9, wherein the computation unit employs, as the degree of reliability of a certain associated point, a weighted sum of a distance between the certain corresponding point and a sampling point that is included in sampling points other than the certain corresponding point and is closest to the certain corresponding point, and an error between local patterns around the certain corresponding point.

11. A resolution conversion method comprising:
acquiring, from an image source, a target image as a target of resolution conversion;
acquiring an additional image from the image source;
estimating a corresponding point in the target image using a plurality of corresponding point estimation methods, the corresponding point being associated with at least one pixel in the additional image to obtain a plurality of corresponding points in the target image;
setting a pixel value of each pixel included in the additional image as a sampling value for the corresponding point when each pixel is set as a target pixel, to obtain a plurality of sampling values for pixels included in the additional image; and
generating an image of a first resolution into which a second resolution of the target image is converted, using pixel values and positions of a plurality of pixels included in the target image, and the sampling values and positions of the corresponding points.

12. A computer-readable medium including computer executable instructions, wherein the instructions, when executed by a processor, cause the processor to perform a method comprising:
acquiring, from an image source, a target image as a target of resolution conversion;
acquiring an additional image from the image source;
estimating a corresponding point in the target image using a plurality of corresponding point estimation methods, the corresponding point being associated with at least one pixel in the additional image to obtain a plurality of corresponding points in the target image;
setting a pixel value of each pixel included in the additional image as a sampling value for the corresponding point when each pixel is set as a target pixel, to obtain a plurality of sampling values for pixels included in the additional image; and
generating an image of a first resolution into which a second resolution of the target image is converted, using pixel values and positions of a plurality of pixels included in the target image, and the sampling values and positions of the corresponding points.

* * * * *